United States Patent
Jeon et al.

(10) Patent No.: US 12,271,215 B2
(45) Date of Patent: Apr. 8, 2025

(54) SYSTEM ON CHIP INCLUDING A SUPPLEMENTAL POWER SUPPLY CIRCUIT

(71) Applicant: SAMSUNG ELECTRONICS CO., LTD., Suwon-si (KR)

(72) Inventors: Ho-Yeon Jeon, Hwaseong-si (KR); Mun Won Lee, Pyeongtaek-si (KR)

(73) Assignee: Samsung Electronics Co., Ltd. (KR)

( * ) Notice: Subject to any disclaimer, the term of this patent is extended or adjusted under 35 U.S.C. 154(b) by 155 days.

(21) Appl. No.: 17/591,707

(22) Filed: Feb. 3, 2022

(65) Prior Publication Data
US 2022/0374033 A1   Nov. 24, 2022

(30) Foreign Application Priority Data
May 20, 2021   (KR) ......................... 10-2021-0064872

(51) Int. Cl.
G05F 1/565 (2006.01)
G05F 1/46 (2006.01)
H02M 3/158 (2006.01)

(52) U.S. Cl.
CPC .............. G05F 1/465 (2013.01); G05F 1/565 (2013.01); H02M 3/1582 (2013.01)

(58) Field of Classification Search
CPC ......... G05F 1/462; G05F 1/465; G05F 1/468; G05F 1/56; G05F 1/575; G05F 1/562; G05F 1/565; G05F 1/567; G05F 1/569; G05F 1/571; G05F 1/573; G05F 1/5735
See application file for complete search history.

(56) References Cited

U.S. PATENT DOCUMENTS

| | | | |
|---|---|---|---|
| 9,086,712 B2 | 7/2015 | Fefer et al. | |
| 9,454,196 B2 | 9/2016 | Knoth et al. | |
| 9,651,962 B2* | 5/2017 | Bernardon | G05F 1/575 |
| 9,761,280 B2* | 9/2017 | Kim | G11C 5/143 |
| 10,162,373 B1 | 12/2018 | Chong et al. | |
| 10,181,845 B1* | 1/2019 | Das | H03F 3/2175 |
| 10,591,947 B2* | 3/2020 | Terasaki | G01R 19/16519 |
| 10,644,591 B1* | 5/2020 | Zhang | H02M 1/14 |
| 10,745,023 B2 | 8/2020 | Srivastava et al. | |
| 10,852,756 B2* | 12/2020 | Luria | G05F 1/56 |
| 11,402,413 B1* | 8/2022 | Mohan | G06F 1/3296 |
| 2002/0140494 A1* | 10/2002 | Thomas | H02J 1/10 |
| | | | 327/530 |
| 2003/0122530 A1* | 7/2003 | Hikita | G05F 1/573 |
| | | | 361/18 |

(Continued)

FOREIGN PATENT DOCUMENTS

| | | |
|---|---|---|
| KR | 10-1387300 B1 | 4/2014 |
| KR | 10-2019-0124771 A | 11/2019 |
| KR | 10-2168501 B1 | 10/2020 |

*Primary Examiner* — Sean Kayes
*Assistant Examiner* — Nusrat Quddus
(74) *Attorney, Agent, or Firm* — Fish & Richardson P.C.

(57) ABSTRACT

A system-on-chip is provided. The SoC includes a system power supply circuit which outputs a first supply voltage, an intellectual property (IP) which receives the first supply voltage and operates at a second supply voltage, a supplemental power supply circuit which generates a supplemental voltage; and a comparator which compares the first supply voltage with the second supply voltage and outputs a comparison signal, wherein the supplemental voltage is provided to the IP based on the comparison signal.

14 Claims, 7 Drawing Sheets

(56) References Cited

U.S. PATENT DOCUMENTS

| | | | | |
|---|---|---|---|---|
| 2007/0229148 A1* | 10/2007 | Hachiya | ............... | G05F 3/24 |
| | | | | 327/540 |
| 2009/0212635 A1* | 8/2009 | Paradissis | ............... | H02J 9/061 |
| | | | | 320/103 |
| 2011/0090754 A1* | 4/2011 | Kim | ............... | G06F 1/3275 |
| | | | | 327/540 |
| 2012/0194162 A1* | 8/2012 | Lin | ............... | H02M 1/14 |
| | | | | 323/304 |
| 2013/0057238 A1* | 3/2013 | Fang | ............... | H03K 7/08 |
| | | | | 323/271 |
| 2015/0042301 A1* | 2/2015 | Narwal | ............... | G05F 3/08 |
| | | | | 323/281 |
| 2015/0171743 A1* | 6/2015 | Yeon | ............... | G05F 1/575 |
| | | | | 323/282 |
| 2016/0065139 A1* | 3/2016 | Lee | ............... | H03F 3/211 |
| | | | | 330/297 |
| 2016/0134188 A1* | 5/2016 | Brnada | ............... | H02M 3/156 |
| | | | | 315/294 |
| 2016/0246342 A1* | 8/2016 | Muthukaruppan | ............... | G05F 1/59 |
| 2018/0032095 A1* | 2/2018 | Lee | ............... | G05F 1/575 |
| 2018/0152144 A1* | 5/2018 | Choo | ............... | H03F 3/211 |
| 2019/0227614 A1* | 7/2019 | Grand | ............... | G06F 1/3287 |
| 2020/0333818 A1* | 10/2020 | Yun | ............... | G06F 1/28 |
| 2021/0215785 A1* | 7/2021 | Perez | ............... | G01R 19/0092 |
| 2021/0336594 A1* | 10/2021 | Benboudjema | ............... | G01S 7/4868 |
| 2022/0100218 A1* | 3/2022 | Jung | ............... | G05F 1/575 |
| 2022/0231672 A1* | 7/2022 | Heshami | ............... | H03K 3/012 |
| 2023/0205242 A1* | 6/2023 | Gil | ............... | G05F 1/563 |
| | | | | 323/266 |

\* cited by examiner

SYSTEM ON CHIP INCLUDING A SUPPLEMENTAL POWER SUPPLY CIRCUIT

CROSS-REFERENCE TO RELATED APPLICATION

This application claims priority under 35 U.S.C. § 119 to Korean Patent Application No. 10-2021-0064872 filed on May 20, 2021, in the Korean Intellectual Property Office, the disclosure of which is incorporated by reference herein in its entirety.

BACKGROUND

1. Field

Embodiments relate to a system-on-chip.

2. Description of the Related Art

The system-on-chip mounted inside a device may include various regulators that provide an output voltage to supply power to various system components such as a control circuit, an input and output circuit, an array core circuit, and a peripheral component. The regulators may include, e.g., a buck regulator, a boost regulator, and a low-dropout (LDO) regulator. A regulator output voltage may correspond to various voltage rails for device such as a supply rail, a reference rail, and an input and output rail.

SUMMARY

Embodiments are directed to a system-on-chip, including: a system power supply circuit which outputs a first supply voltage; an intellectual property (IP) which receives the first supply voltage and operates at a second supply voltage; a supplemental power supply circuit which generates a supplemental voltage; and a comparator which compares the first supply voltage with the second supply voltage and outputs a comparison signal. The supplemental voltage may be provided to the IP based on the comparison signal.

Embodiments are directed to a system-on-chip, including: a system power supply circuit which outputs a first supply voltage; a plurality of intellectual properties (IPs) that each operate at a respective second supply voltage; at least one supplemental power supply circuit; and a plurality of comparators, each of which compares a respective one of the second supply voltages with the first supply voltage to output a comparison signal for a corresponding one of the plurality of IPs. A supplemental voltage corresponding to each of the comparison signals may be generated by the supplemental power supply circuit and provided to a respective one of the plurality of IPs.

Embodiments are directed to a power supply method of a system-on-chip, the method including: setting a detection range of a comparator; receiving each of a first supply voltage and a second supply voltage of an intellectual property (IP) by the comparator; comparing the first supply voltage with the second supply voltage based on the set detection range; and supplying a supplemental voltage from a supplemental power supply circuit to the IP, when a comparison result deviates from the detection range.

BRIEF DESCRIPTION OF THE DRAWINGS

Features will become apparent to those of skill in the art by describing in detail example embodiments with reference to the attached drawings in which.

DETAILED DESCRIPTION

Figure 1:
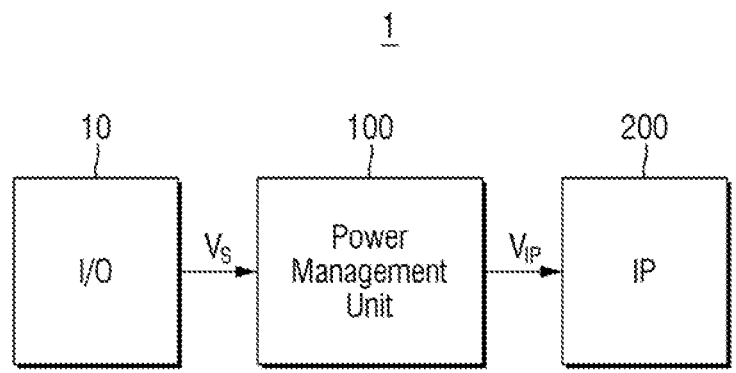
FIG. 1 is a block diagram for explaining a system-on-chip according to some embodiments.
Figure 2:
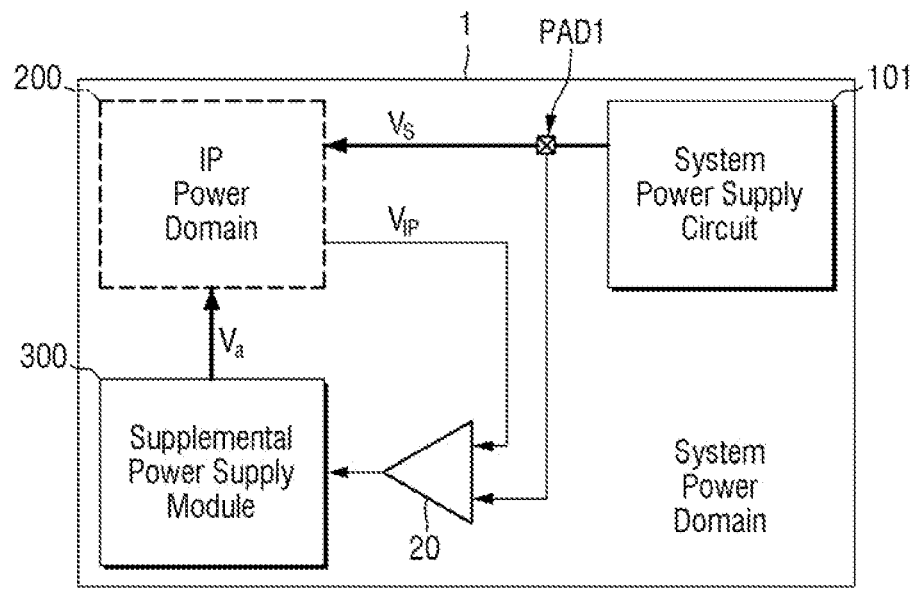
FIG. 2 is a block diagram for explaining the system-on-chip according to some embodiments.

FIG. 1 is a block diagram for explaining a system-on-chip according to some embodiments, and FIG. 2 is a block diagram for explaining the system-on-chip according to some embodiments.

Referring to FIG. 1, a system on chip 1 (hereinafter, SoC) according to some embodiments includes an input/output (I/O) interface 10, a power management unit 100, and an IP (Intellectual Property) 200 or plurality thereof.

The input/output interface 10 receives an external supply voltage from the outside, and sends it to the SoC 1.

The SoC 1 may include a power management unit 100 to distribute the external supply voltage to at least one IP 200. The power management unit 100 may include at least one converter for boosting or reducing the external supply voltage (e.g., a buck converter) received from an external power supply circuit (e.g., a battery etc.).

The power management unit 100 boosts or reduces the external supply voltage, and supplies the power at the internal power supply voltage corresponding to each IP 200.

The IP 200 receives a supply voltage Vs that is output from the power management unit 100. An internal supply voltage $V_{IP}$ may be the same voltage as the system supply voltage or may be a boosted voltage, depending on various embodiments. However, the internal supply voltage $V_{IP}$ may have a value different from the voltage value Vs that is output from the power management unit 100. The SoC 1 monitors a difference between the output voltage Vs intended by the power management unit 100 and the internal power supply voltage $V_{IP}$ at which the IP 200 actually operates, and may supply a supplemental voltage to the IP 200 when the difference deviates from a preset range.

The IP 200 is a functional circuit designed to perform various functions in the system. For example, the IP 200 may include a processing unit, a plurality of cores included in the processing unit, a MFC (Multi-Format Codec), a video module (e.g., camera interface, a JPEG (Joint Photographic Experts Group) processor, a video processor, a mixer, etc.), a 3D graphic core, an audio system, a driver, a display driver, a volatile memory, a non-volatile memory, a memory controller, an input and output interface block, a cache memory, or the like.

Hereinafter, for convenience of the explanation, the voltage output from the power management unit 100, that is, the intended voltage Vs, is referred to as a first supply voltage, and the internal supply voltage $V_{IP}$ received by the IP 200 to operate is referred to as a second supply voltage.

The SoC 1 may be divided into a system power domain and an IP power domain from the viewpoint of power domains. The system power domain refers to a domain that operates at a system supply voltage supplied to the SoC 1 itself. The IP power domain refers to a domain that operates at an internal operating voltage supplied to the IP 200.

Referring to FIG. 2, the SoC 1 may include a system power supply circuit 101, the IP 200, a supplemental power supply module 300, and a comparator 20.

The system power supply circuit 101 may be included in the power management unit 100 of FIG. 1. According to some embodiments, the system power supply circuit 101 may be a regulator circuit, and may be a buck regulator as an example. The system power supply circuit 101 provides the first supply voltage Vs to the IP power domain through a first pad PAD1 of the IP 200.

The IP 200 receives the first supply voltage Vs, and operates at the second supply voltage $V_{IP}$. At this time, although the second supply voltage $V_{IP}$ should be the same as the first supply voltage Vs, the second supply voltage $V_{IP}$ may have a value different from the first supply voltage Vs due to some factors of the SoC 1 or the IP 200. As an example, the first supply voltage Vs provided to the first pad PAD1 may have a stable output voltage, while on the other hand, the second supply voltage $V_{IP}$ inside the IP 200 may have an unstable voltage in which the output wobbles. Alternatively, as another example, the second supply voltage $V_{IP}$ may also be a voltage which is different from the first supply voltage Vs by a preset range or more.

The comparator 20 compares the first supply voltage Vs to the second supply voltage $V_{IP}$, and outputs a comparison signal. The comparator 20 may output a change in the second supply voltage $V_{IP}$ as the comparison signal based on the first supply voltage Vs according to some embodiments.

The supplemental power supply module 300 may generate a supplemental voltage Va based on the comparison signal, and may provide the supplemental voltage Va to the IP, that is, to the IP power domain. As shown in FIG. 2, the supplemental power supply module 300 may be a power supply circuit which is placed apart from the IP 200. The supplemental power supply module 300 may be a power supply circuit placed separately from the system power supply circuit 101 according to an embodiment, or (not shown) may be a part of the system power supply circuit 101 according to another embodiment. The supplemental power supply module 300 will be described in detail below in FIG. 3.

Figure 3:
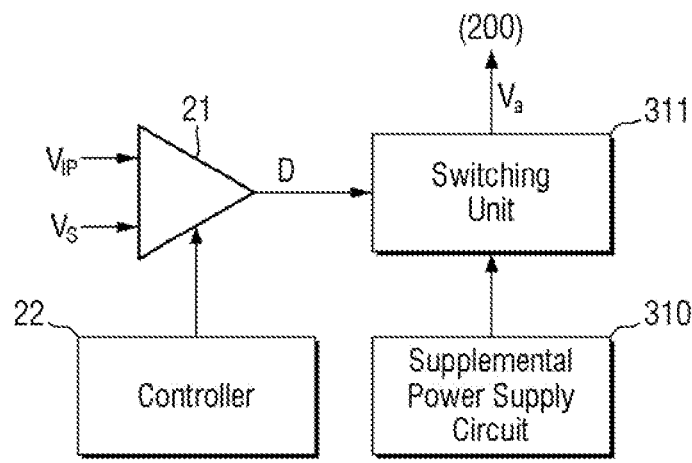
FIG. 3 is a block diagram for explaining a system-on-chip according to some embodiments.
Figure 4:
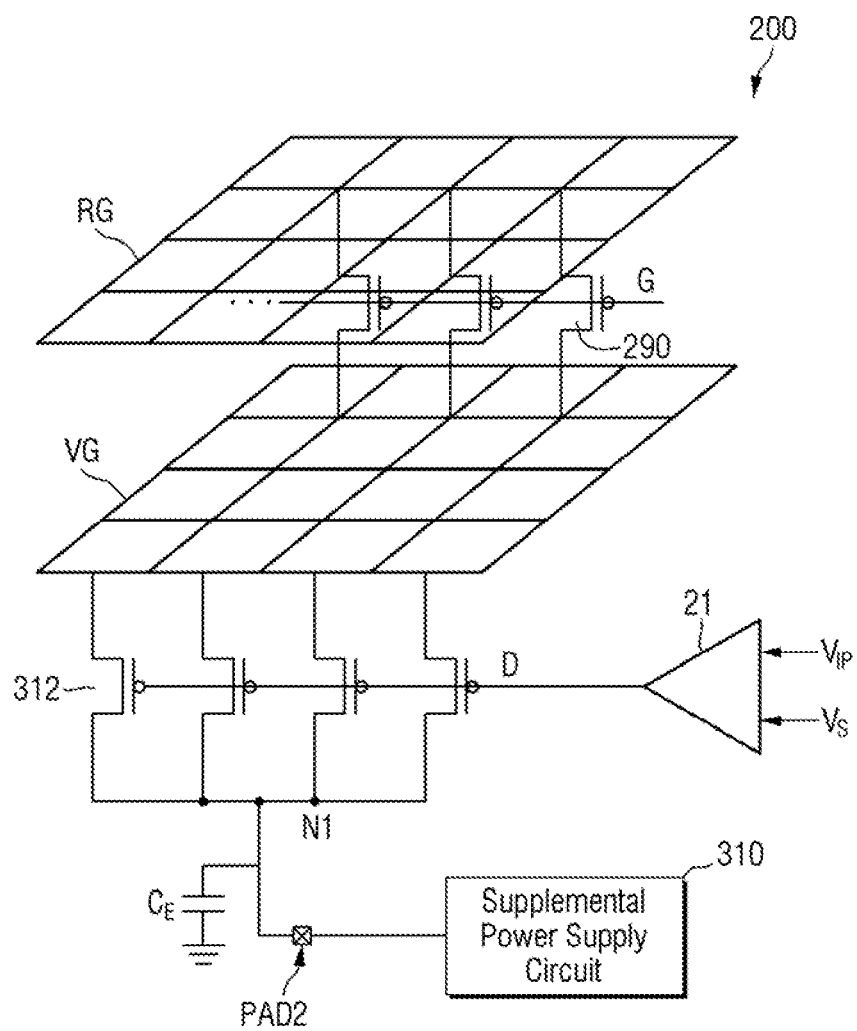
FIG. 4 is a block diagram showing an embodiment of the system-on-chip of FIG. 3.

FIG. 3 is a block diagram for explaining a system-on-chip according to some embodiments. FIG. 4 is a block diagram showing an embodiment of the system-on-chip of FIG. 3.

The comparator 20 may be a comparator 21 that includes a controller 22 according to some embodiments, as shown in FIG. 3. The controller 22 may be a digital controller as an example.

The controller 22 may adjust a gain of the comparator 21 to adjust an output voltage range of a comparison signal D as an example. The controller 22 may store a preset allowable fluctuation range of the second supply voltage $V_{IP}$ in comparison with the first supply voltage Vs, and may control the comparator 21 to output the comparison signal D only when the fluctuation range is exceeded as another example.

The supplemental power supply module 300 is a power supply module placed independently of the IP 200, and includes a supplemental power supply circuit 310. The supplemental power supply circuit 310 generates the supplemental voltage Va to compensate for a difference when the second supply voltage $V_{IP}$ is different from the first supply voltage Vs by a preset range or more. The supplemental power supply circuit 310 may be, for example, a low voltage drop-out regulator.

The supplemental power supply module 300 may further include a switching unit 311 according to some embodiments. The switching unit 311 may receive the comparison signal D output from the comparator 21, and switch output of the supplemental voltage Va to the IP 200.

The supplemental power supply circuit 310 may be connected to the switching unit 312 through a second pad PAD2 according to some embodiments. The second pad PAD2 may be an input/output pad separate from the first pad PAD1.

The switching unit 311 may further include a capacitor $C_L$ (not shown). The capacitor $C_L$ may smooth out the supplemental voltage Va provided by the supplemental power supply module 300 to the IP 200.

According to some embodiments, the comparator 21 may provide the switching unit 311 with the comparison signal D including information about i) whether a difference of the second supply voltage $V_{IP}$ compared to the first supply voltage Vs is within or exceeds a preset range or ii) how much difference is when the difference exceeds the preset range, under the control of the controller 22.

According to some embodiments, if the comparison signal D is simply a low and high 1-bit signal, the switching unit 311 is turned off or turned on, and may not provide the supplemental voltage Va to the IP 200 or may provide the supplemental voltage Va to the IP 200. The switching unit 311 may be implemented by a switch or transistor that is turned off or turned on by the comparison signal D. As an example, the switching unit 311 may be a P-type transistor 312 in which the comparison signal D is applied to the gate and the source and drain terminals are connected to the supplemental power supply circuit 310 and the IP power domain, as shown in FIG. 4.

FIG. 4 illustrates internal power supply grids including a real grid RG and a virtual grid VG. Referring to FIG. 4, the second supply voltage $V_{IP}$ may be a voltage of a real grid RG inside the IP 200 according to an embodiment, and may also be a voltage of a virtual grid VG inside the IP 200 according to another embodiment. The real grid RG may be an operating power supply grid measured by an IP 200 power rail connected through the first pad (PAD1 of FIG. 2) in the IP 200. The virtual grid VG may be a power supply grid of an IP power domain connected from the real grid RG via a power gating transistor 290. That is, the power gating transistor 290 may have the real grid RG and the virtual grid VG connected to both ends. The power gating transistor 290 provides the supply voltage to the virtual grid VG from the real grid RG according to the control signal G provided by the controller or the like inside the power management unit 100.

According to some embodiments, the comparator 21 may map the comparison result between the first supply voltage Vs and the second supply voltage $V_{IP}$ into a table form under the control of the controller 22, and then may output the comparison signal D corresponding to a mapping value. For example, the controller 22 may store a mapping table in which a maximum value and a minimum value of the difference between the first supply voltage Vs and the second supply voltage $V_{IP}$ are set in advance and divided into a plurality of sections, and may output an actual difference value between the first supply voltage Vs and the second supply voltage $V_{IP}$ to control the comparison signal D corresponding to the mapping value of the corresponding section in the mapping table. At this time, the switching unit 311 may select the supplemental voltage Va corresponding to the comparison signal D from among a plurality of supplemental voltages that may be provided by the supplemental power supply circuit 310, and may provide the supplemental voltage Va to the IP 200.

Figure 5:
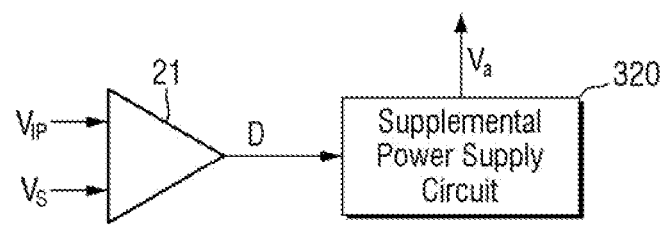
FIG. 5 is a block diagram showing an embodiment of the system-on-chip of FIG. 2.
Figure 6:
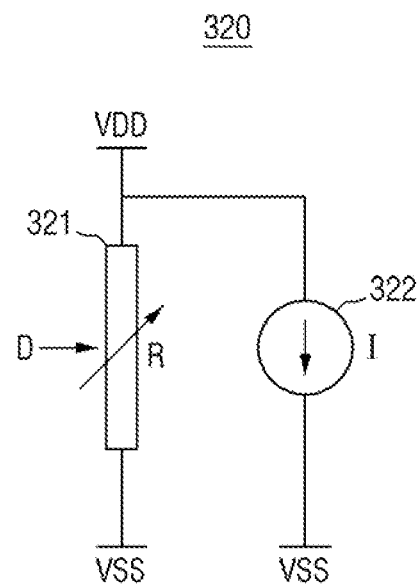
FIG. 6 shows an embodiment of a supplemental voltage supply circuit of FIG. 5.

FIG. 5 is a block diagram showing an embodiment of the system-on-chip of FIG. 2, and FIG. 6 shows an embodiment of a supplemental voltage supply circuit of FIG. 5.

According to some embodiments, a supplemental power supply circuit 320, other than the switching unit 311, may receive the comparison signal D directly from the comparator 21, unlike FIG. 4.

The comparator 21 may output the difference value between the first supply voltage Vs and the second supply voltage $V_{IP}$ as the comparison signal D. In this case, the comparison signal D may be an analog signal.

The supplemental power supply circuit 320 may directly receive the comparison signal D, and adjust the supplemental voltage Va based on the comparison signal D.

According to some embodiments, the supplemental power supply circuit 320 may store a mapping table in which the maximum value and the minimum value of the difference between the first supply voltage Vs and the second supply voltage $V_{IP}$ are set in advance and divided into the plurality of sections, and may provide the supplemental voltage Va mapped to the comparison signal D to the IP 200.

The supplemental power supply circuit 320 may include a variable resistor (R) 321 and a current source (I) 322 in an embodiment, as in the example shown in FIG. 6. When the supplemental power supply circuit 320 receives the comparison signal D, the supplemental power supply circuit 320 may vary the variable resistor (R) 321 based on the comparison signal D. The supplemental power supply circuit 320 may provide the IP 200 with the supplemental voltage Va based on the variable resistance variable to the comparison signal D and the current source.

Figure 7:
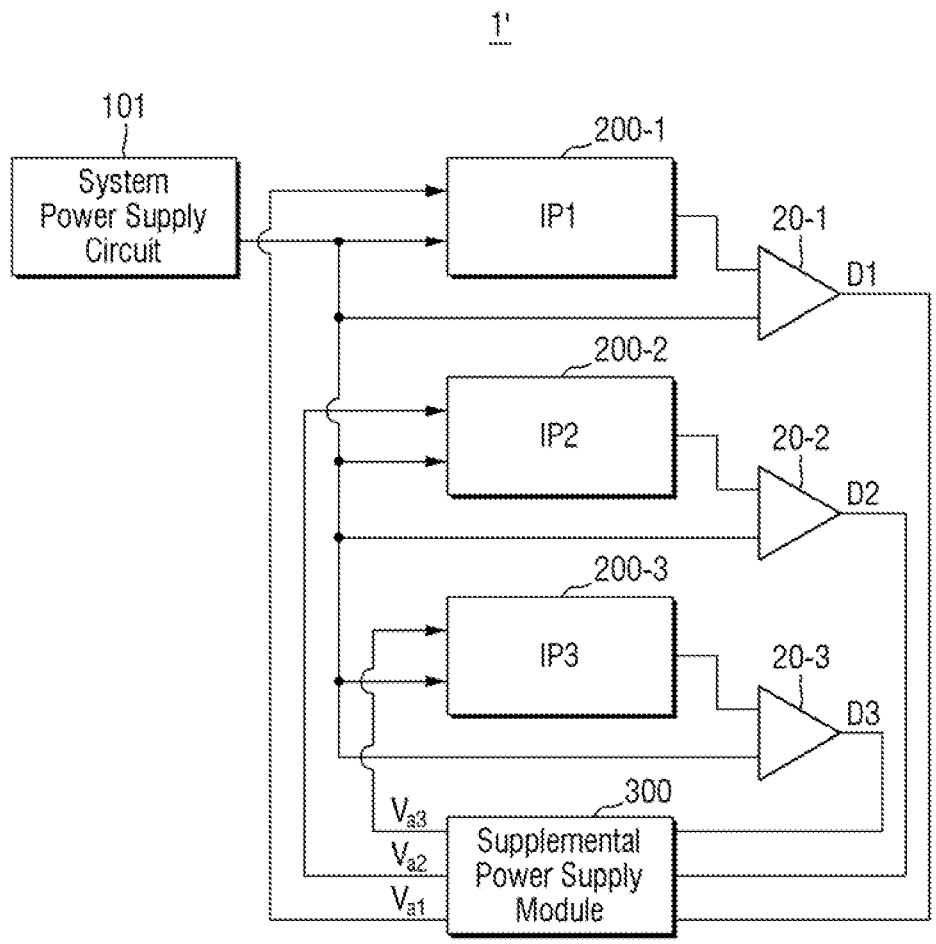
FIG. 7 is a block diagram for explaining a system-on-chip according to some embodiments.

FIG. 7 is a block diagram for explaining a system-on-chip according to some embodiments.

Referring to FIG. 7, a SoC 1' may include a plurality of IPs 200-1 to 200-3. Although FIG. 7 shows three IPs, the embodiment is not limited thereto.

When a first supply voltage of an IP1 200-1 is $V_{S1}$ and a second supply voltage is $V_{IP1}$, a first supply voltage of an IP2 200-2 is $V_{S2}$ and a second supply voltage is $V_{IP2}$, and a first supply voltage of an IP1 200-3 is $V_{S3}$ and a second supply voltage is $V_{IP3}$, the first supply voltages $V_{S1}$, $V_{S2}$ and $V_{S3}$ may all have the same voltage level according to an embodiment, and at least one thereof may have a different voltage level according to another embodiment.

For convenience of explanation, as shown in FIG. 7, a case where the first supply voltages $V_{S1}$, $V_{S2}$ and $V_{S3}$ all have the same voltage level will be described according to an embodiment.

Comparators 20-1 to 20-3 are respectively placed for each of the IPs 200-1 to 200-3 to compare the first supply voltage with the second supply voltage according to some embodiments.

For example, a comparator 20-1 may compare the first supply voltage $V_{S1}$ with the second supply voltage $V_{IP1}$, and provide a D1 signal to the supplemental power supply module 300 as a comparison result. A comparator 20-2 may compare the first supply voltage $V_{S2}$ with the second supply voltage $V_{IP2}$ and provide a D2 signal to the supplemental power supply module 300 as a comparison result. A comparator 20-3 may compare the first supply voltage $V_{S3}$ with the second supply voltage $V_{IP3}$ and provide a D3 signal to the supplemental power supply module 300 as a comparison result.

The supplemental power supply module 300 may be implemented like the supplemental power supply module described in FIGS. 2 to 6 according to some embodiments.

As an example, the comparison signals D1 to D3 may be directly provided to a single supplemental power supply module 300, and the supplemental power supply module 300 may provide each of the IPs IP1 to IP3 with supplemental voltages $V_{a1}$ to $V_{a3}$ corresponding to each of the comparison signals D1 to D3.

Alternatively, as another example, the supplemental power supply module 300 may further include a switching unit 311 as shown in FIG. 3, and the switching unit 311 may receive the comparison signals D1 to D3 and be turned on or turned off, and may provide each of the IPs IP1 to IP3 with the supplemental voltages $V_{a1}$ to $V_{a3}$ corresponding to each of the comparison signals D1 to D3.

On the other hand, although the supplemental power supply module 300 of FIG. 7 shows only one supplemental power supply module, a plurality of supplemental power supply modules 300 may be implemented according to various embodiments.

As an example, the supplemental power supply modules 300 may be implemented in as many as the number of IPs 200 to generate an adaptive supplemental voltage for each IP and provide it to the corresponding IP. Alternatively, as another example, the supplemental power supply module 300 may be implemented in as many as a number of IP groups. At this time, the IP group may mean grouping of IPs having a same internal power supply voltage level into a single group.

Figure 8:
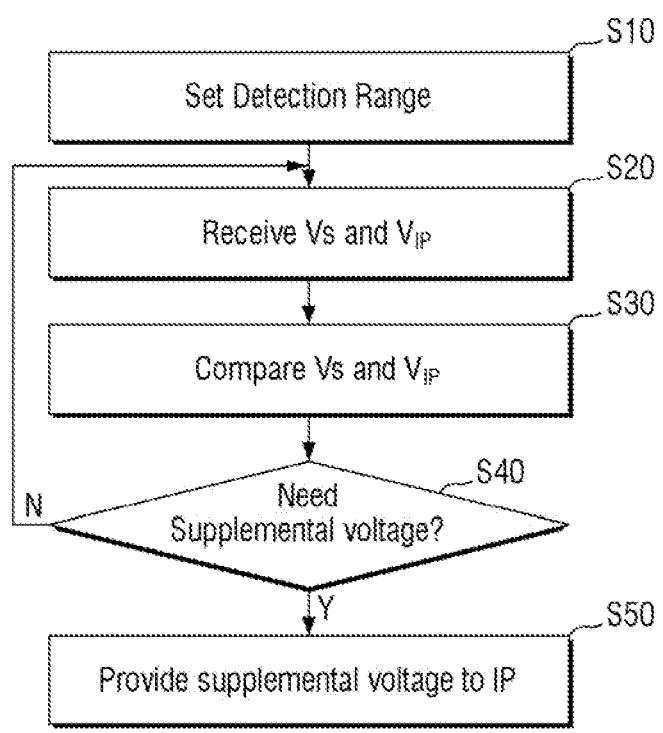
FIG. 8 is a flowchart for explaining a power supply method of the system-on-chip according to some embodiments.

FIG. 8 is a flowchart for explaining a power supply method of the system-on-chip according to some embodiments.

Referring to FIG. 8, the system-on-chip first sets a detection range of the comparator 20 (S10). The detection range may be a setting of a maximum value and a minimum value of a difference between the first supply voltage Vs and the second supply voltage $V_{IP}$ according to various embodiments, setting of the output voltage range, a setting of the map table etc., within the range of the difference value, or the like.

After receiving the system supply voltage, the system-on-chip regulates the system supply voltage according to each IP. The comparator 20 compares the regulated first supply voltage Vs with the second supply voltage $V_{IP}$ used in the chip (S30).

The system-on-chip selectively generates (S40) an appropriate compensation voltage according to the comparison result or the comparison signal and provides it to the IP 200 (S50). At this time, the system-on-chip may adjust the supplemental voltage Va to correspond to the comparison result and/or the comparison signal.

Figure 9:
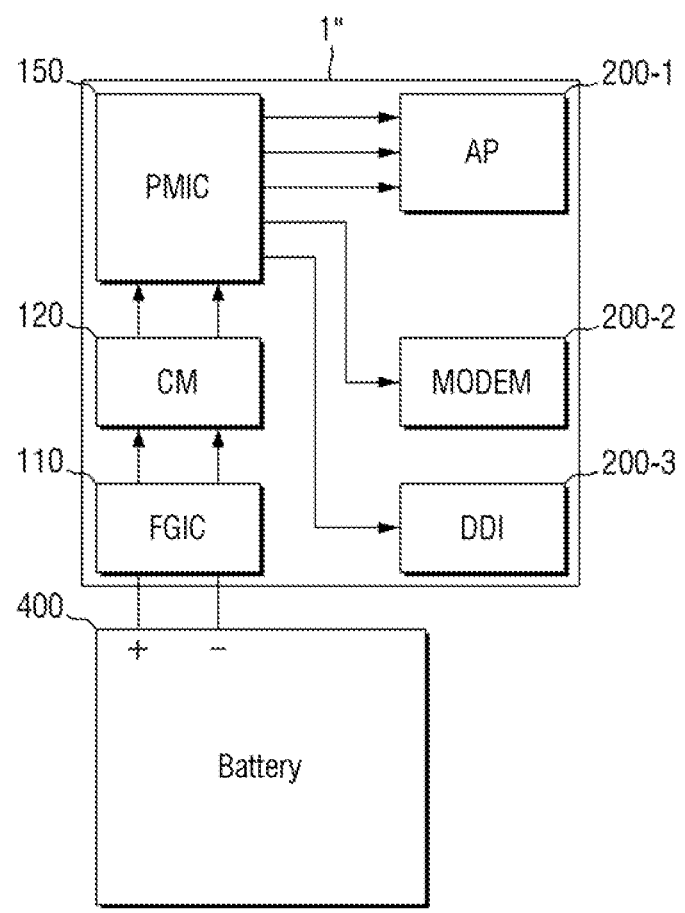
FIGS. 9 and 10 are block diagrams for explaining an electronic device according to some embodiments.
Figure 10:
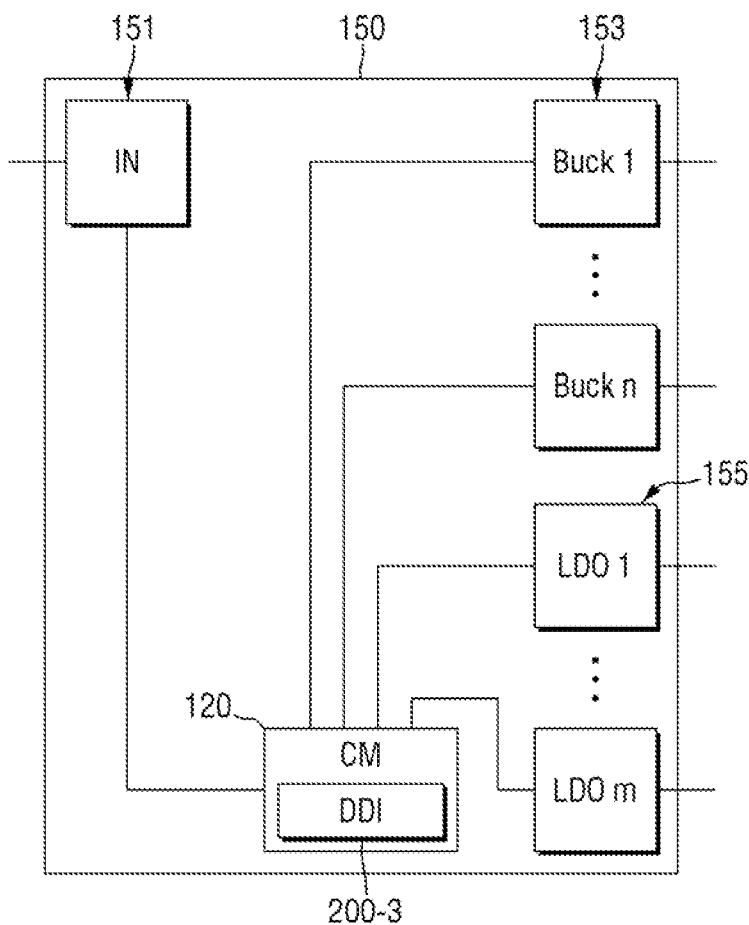

FIGS. 9 and 10 are block diagrams for explaining an electronic device according to some embodiments.

Referring to FIG. 9, the electronic device may include a system-on-chip 1" and a battery 400.

The battery 400 supplies the power to the electronic device including the system-on-chip 1". The battery 400 is connected to a FGIC 110 (fuel guage integrated circuit). The FGIC 110 may measure a charging status of the battery 400. Specifically, the FGIC 110 may accurately measure the current, voltage and temperature of the battery to know the charging status of the battery. The battery 400 supplies the power to a PMIC (power management integrated circuit) 150 through the FGIC 110.

When the electronic device including the system-on-chip 1" is not in use, the PMIC 150 may change the electronic device to a low power status or reduce an energy consumption. Also, the PMIC 150 may supply the power to various IPs (200 of FIG. 1) mounted on the PCB 12. For example, the PMIC 150 may supply powers having different voltage levels from each other to the application processor 200-1. Further, the PMIC 150 may supply power to, e.g., a MODEM 200-2 (modulator-demodulator) and a DDI 200-3 (display driver integrated circuit).

A current meter (CM) 120 may be installed between the FGIC 110 and the PMIC 150 to measure real-time power consumption. The current meter 120 may be further equipped with a mean power calculator to calculate real-time power consumption as a mean value according to a time window.

Further, the application processor 200-1 according to the embodiment may receive the real-time power consumption measured by the current meter 120 and calculate the mean power depending on the time window.

On the other hand, the PMIC 150 may include the current meter 120 that may measure the power consumption from an input end to an output end inside the PMIC 150 to measure the power consumption in real time. The PMIC 150 including the current meter 120 will be described through FIG. 10.

Referring to FIGS. 9 and 10, in order to measure the real-time power consumption, the PMIC 150 includes the current meter 120 that may measure the power consumption at the input end and the output end inside the PMIC 150. The current meter 120 may measure a total input current that is input from the battery 400.

The PMIC 150 includes an input port (IN) 151, at least one LDO regulator (Low Dropout Regulator) 155 (LDO 1 . . . LDO m), at least one Buck regulator 153 (Buck 1 . . . Buck n), and the current meter 120 that may measure the real-time power consumptions of each of the input port 151, the LDO regulator 155 and the Buck regulator 153.

The LDO regulator 155 is used when the voltage drop of the output voltage is smaller than the input voltage. The Buck regulator 153 generates an output voltage that is lower than the input voltage.

According to some embodiments, at least one of the Buck regulators 153 of FIG. 10 may be included in the system power supply circuit 101 of FIG. 2. At least one of the LDO regulators 155 of FIG. 10 may be included in the supplemental power supply module 300 of FIG. 2.

According to an embodiment, the current meter CM may include a mean power calculator MPC that may receive the real-time power consumption and calculate the mean power depending on the time window.

By way of summation and review, as a regulator output voltage drops according to a system component, in some cases, an expected voltage drop may not occur depending on factors such as a silicon substrate of the component. Thus, embodiments may provide a system-on-chip including an IP that operates at a power supply voltage compensated for an unexpected voltage drop.

As described above, embodiments relate to a system-on-chip for compensating for a voltage drop. According to various embodiments described above, even if the output voltage of the regulator drops according to the system components and then an unexpected voltage drop occurs, by providing the supplemental voltage based on the difference between the actually received supply voltages based on the supplied supply voltage, the system-on-chip may operate stably, and the performance and reliability may be improved.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A system-on-chip, comprising:
 a system power supply circuit, which outputs a first supply voltage;
 a functional circuit, which receives the first supply voltage and operates at a second supply voltage;
 a supplemental power supply circuit, which is configured to generate a supplemental voltage and comprises at least one variable resistor and a current source;
 a comparator, which compares the first supply voltage with the second supply voltage and outputs a comparison signal; and
 a switching unit, which includes a plurality of transistors and is connected to the supplemental power supply circuit and gated according to the comparison signal,
 wherein the supplemental voltage is provided to the functional circuit based on the comparison signal,
 wherein the supplemental power supply circuit is configured to directly receive the comparison signal and provide the supplemental voltage, which is adjusted based on the comparison signal, to the functional circuit, and
 wherein:
  the at least one variable resistor is variable according to the comparison signal,
  the comparator includes a controller configured to adjust a gain,
  the controller adjusts an output range of the comparison signal according to the gain, and
  the comparison signal is based on a difference between the second supply voltage and the first supply voltage.

2. The system-on-chip as claimed in claim 1, wherein the functional circuit uses the first supply voltage received through a first pad as the second supply voltage.

3. The system-on-chip as claimed in claim 1, wherein the supplemental power supply circuit and the switching unit are placed inside the functional circuit.

4. The system-on-chip as claimed in claim 1, wherein:
 the supplemental power supply circuit is placed outside the functional circuit and connected to a second pad of the functional circuit, and
 the switching unit is connected to the second pad and an internal power supply grid of the functional circuit.

5. A system-on-chip, comprising:
 a system power supply circuit, which outputs a first supply voltage;
 a plurality of functional circuits that each operate at a respective second supply voltage;

at least one supplemental power supply circuit comprising a current source and a plurality of variable resistors; and a plurality of comparators, each of which is configured to compare a respective one of the second supply voltages with the first supply voltage to output a corresponding comparison signal for a corresponding one of the plurality of functional circuits, wherein a supplemental voltage corresponding to each of the corresponding comparison signals is generated by the supplemental power supply circuit and provided to a respective one of the plurality of functional circuits, and wherein each of variable resistor of the plurality of variable resistors is variable according to a corresponding one of the comparison signals and is configured to vary a corresponding supplemental voltage.

6. The system-on-chip as claimed in claim 5, wherein each functional circuit of the plurality of functional circuits includes a virtual grid to which the respective second supply voltage is supplied, and the system-on-chip further includes a plurality of transistors, which are connected between the virtual grid and an output end of the supplemental power supply circuit and are gated by a corresponding one of the comparison signals.

7. The system-on-chip as claimed in claim 6, wherein each comparator of the plurality of comparators includes a controller, which adjusts an output voltage range of a corresponding one of the comparison signals.

8. The system-on-chip as claimed in claim 5, wherein each functional circuit of the plurality of functional circuits includes:

a real grid, which operates by conversion of the first supply voltage received through a first pad into a respective one of the second supply voltages;

a virtual grid; and a plurality of power gating transistors having ends connected between the real grid and the virtual grid.

9. The system-on-chip as claimed in claim 8, wherein each comparator of the plurality of comparators:

receives any one of a supply voltage provided to the real grid or a supply voltage provided to the virtual grid in a corresponding one of the plurality of functional circuits, and compares the received supply voltage with the first supply voltage.

10. A power supply method of a system-on-chip, the method comprising:

setting a detection range of a comparator;

receiving each of a first supply voltage and a second supply voltage of a functional circuit by the comparator;

comparing the first supply voltage with the second supply voltage based on the set detection range; and supplying a supplemental voltage from a supplemental power supply circuit to the functional circuit, when a comparison result deviates from the detection range, wherein the setting of the detection range includes setting a maximum value and a minimum value of a difference between the first supply voltage and the second supply voltage.

11. The power supply method of the system-on-chip as claimed in claim 10, wherein the system-on-chip adjusts the supplemental voltage to correspond to the comparison result, and supplies the supplemental voltage to the functional circuit.

12. The power supply method of the system-on-chip as claimed in claim 11, wherein:

the supplemental power supply circuit includes:

a variable resistor that is variable to correspond to the comparison result; and a current source, and the supplemental power supply circuit sets a variable voltage, which is output to correspond to the variable resistor, as the supplemental voltage, and outputs the supplemental voltage to the functional circuit.

13. The power supply method of the system-on-chip as claimed in claim 10, wherein the system-on-chip includes a transistor, which is connected between an output end of the supplemental power supply circuit and the functional circuit and is gated according to the comparison result.

14. The power supply method of the system-on-chip as claimed in claim 10, wherein the functional circuit includes:

a real grid, which operates by conversion of the first supply voltage received through a first pad into the second supply voltage;

a virtual grid, which operates at the second supply voltage; and a power gating transistor having ends connected between the real grid and the virtual grid, wherein the comparator receives a supply voltage of the real grid or a supply voltage of the virtual grid as the second supply voltage and compares the received supply voltage with the first supply voltage.

* * * * *